United States Patent
Chen

(10) Patent No.: US 11,005,396 B2
(45) Date of Patent: *May 11, 2021

(54) STARTING METHOD AND APPARATUS FOR PERMANENT MAGNET SYNCHRONOUS MOTOR, POWER SYSTEM, AND UNMANNED AERIAL VEHICLE

(71) Applicant: AUTEL ROBOTICS CO., LTD., Guangdong (CN)

(72) Inventor: Yidong Chen, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,183

(22) Filed: Sep. 11, 2019

(65) Prior Publication Data

US 2020/0007055 A1    Jan. 2, 2020

Related U.S. Application Data

(63) Continuation of application No. 15/883,647, filed on Jan. 30, 2018, now Pat. No. 10,447,185, which is a (Continued)

(30) Foreign Application Priority Data

Nov. 29, 2016 (CN) .......................... 201611087698.0

(51) Int. Cl.
*H02P 6/15* (2016.01)
*H02P 6/06* (2006.01)
(Continued)

(52) U.S. Cl.
CPC ............ *H02P 6/157* (2016.02); *B64C 39/024* (2013.01); *G05D 1/0011* (2013.01); *H02P 6/06* (2013.01);
(Continued)

(58) Field of Classification Search
CPC ...... H02P 6/157; H02P 21/0021; H02P 21/04; H02P 21/34; H02P 6/20; H02P 6/06;
(Continued)

(56) References Cited

U.S. PATENT DOCUMENTS

| 2002/0021106 A1 | 2/2002 | Okamura et al. |
| 2015/0188461 A1 | 7/2015 | Park et al. |

(Continued)

FOREIGN PATENT DOCUMENTS

| CN | 102739148 A | 10/2012 |
| CN | 103746619 A | 4/2014 |

(Continued)

OTHER PUBLICATIONS

International Search Report and Written Opinion dated Jan. 31, 2018; PCT/CN2017/111017.

(Continued)

*Primary Examiner* — Marthe Y Marc-Coleman

(57) ABSTRACT

Implementations of the present application relate to a starting method and apparatus for a permanent magnet synchronous motor, a power system, and an unmanned aerial vehicle (UAV). The method includes: obtaining a current motor rotational speed and motor position information of the permanent magnet synchronous motor; determining whether the current motor rotational speed is less than a preset minimum rotational speed, and if the current motor rotational speed is less than the preset minimum rotational speed, using the preset minimum rotational speed as a feedback rotational speed; otherwise, using the current motor rotational speed as a feedback rotational speed; and performing closed-loop control on the permanent magnet synchronous motor according to the feedback rotational speed and the motor position information. In this way, the starting method is simplified and simpler. Potential failure (Continued)

risks in various states in the prior art are avoided, thereby effectively improving reliability of a starting process.

16 Claims, 6 Drawing Sheets

Related U.S. Application Data continuation of application No. PCT/CN2017/111017, filed on Nov. 15, 2017.

(51) Int. Cl.
    *H02P 6/17* (2016.01)
    *H02P 6/22* (2006.01)
    *H02P 21/14* (2016.01)
    *G05D 1/00* (2006.01)
    *B64C 39/02* (2006.01)
    *H02P 21/00* (2016.01)
    *H02P 21/04* (2006.01)
    *H02P 21/34* (2016.01)
    *H02P 6/20* (2016.01)

(52) U.S. Cl.
    CPC ............... *H02P 6/17* (2016.02); *H02P 6/20* (2013.01); *H02P 6/22* (2013.01); *H02P 21/0021* (2013.01); *H02P 21/04* (2013.01); *H02P 21/141* (2013.01); *H02P 21/34* (2016.02); *B64C 2201/042* (2013.01); *B64C 2201/14* (2013.01); *H02P 2205/01* (2013.01); *H02P 2205/07* (2013.01); *H02P 2207/05* (2013.01)

(58) Field of Classification Search
    CPC .. H02P 6/17; H02P 6/22; H02P 21/141; H02P 2205/07; H02P 2207/05; H02P 2205/01; G05D 1/0011
    See application file for complete search history.

(56) References Cited

U.S. PATENT DOCUMENTS

| | | | |
|---|---|---|---|
| 2015/0333682 A1 | 11/2015 | Amemiya et al. | |
| 2016/0056738 A1* | 2/2016 | Kim | B60L 15/025 318/400.15 |
| 2016/0365819 A1 | 12/2016 | Masuda et al. | |
| 2017/0063263 A1* | 3/2017 | Lee | H02P 6/17 |

FOREIGN PATENT DOCUMENTS

| | | |
|---|---|---|
| CN | 104467551 A | 3/2015 |
| CN | 104811095 A | 7/2015 |
| CN | 104980066 A | 10/2015 |
| CN | 105610354 A | 5/2016 |
| CN | 106385208 A | 2/2017 |
| EP | 1873901 A2 | 1/2008 |
| JP | 2008-505596 A | 2/2008 |
| WO | 2013/025552 A1 | 2/2013 |

OTHER PUBLICATIONS

Extended European Search Report completed Jul. 19, 2018; EP17 82 5092.
The First Chinese Office Action dated May 18, 2018; Appln. No. 201611087698.0.
The Second Chinese Office Action dated Jan. 14, 2019; Appln. No. 201611087698.0.
USPTO NFOA dated Jan. 22, 2019 in connection with U.S. Appl. No. 15/883,647.
USPTO NOA mailed May 22, 2019 in connection with U.S. Appl. No. 15/883,647.

* cited by examiner

STARTING METHOD AND APPARATUS FOR PERMANENT MAGNET SYNCHRONOUS MOTOR, POWER SYSTEM, AND UNMANNED AERIAL VEHICLE

CROSS-REFERENCE

This application is a continuation of U.S. patent application Ser. No. 15/883,647 filed on Jan. 30, 2018, which is a continuation of International Application No. PCT/CN2017/111017, filed on Nov. 15, 2017, which claims priority of Chinese Patent Application No. 201611087698.0 filed on Nov. 29, 2016, both of which are incorporated herein by reference in its entirety.

TECHNICAL FIELD

Implementations of the present application relate to the field of motor control technologies, and in particular, to a starting method and apparatus for a permanent magnet synchronous motor, a power system, and an unmanned aerial vehicle (UAV).

RELATED ART

In control of a permanent magnet synchronous motor, a U/V/W three-phase current is usually controlled by using a driver, to form an electromagnetic field. Since a rotor of the permanent magnet synchronous motor is a permanent magnet, the rotor would rotate under the action of the electromagnetic field formed by the U/V/W three-phase current. A rotational speed and an angle of the rotation of the rotor are estimated and fed back to the driver. The driver compares a feedback value with a target value, and accordingly, adjusts the rotation of the rotor, to implement closed-loop control on the permanent magnet synchronous motor.

In a starting process of the permanent magnet synchronous motor, the estimation on the rotational speed and the angle of the rotor is very important. For a position sensorless control manner for the permanent magnet synchronous motor, a position sensorless control scheme of a non-high-frequency injection method is usually used. This scheme is easy to implement, but has a problem of inaccurate estimation when the motor rotational speed is relatively low. Therefore, in the existing technologies, a motor first needs to be pulled in an open-loop control manner. The open-loop control manner is switched to closed-loop control only when the motor rotational speed is higher than a proper value. In this way, a rotational speed and an angle of the motor can be relatively accurately estimated. Generally, starting of the motor is implemented by using a control method including the following three steps:

Step 1. Locating, in which the rotor of the motor is initially located by using an assumed angle (the locating may need to be performed several times).

Step 2. Open-loop control, in which the motor is pulled by using a speed open-loop control scheme.

Step 3. Switching to closed-loop control, in which the open-loop control is switched to a closed-loop control when the motor rotational speed increases to a particular level.

This method is very complex. For a new motor, many parameters need to be adjusted repeatedly, for example, an assumed angle given during locating, a motor pulling time set in an open-loop process, and a stable rotational speed when the closed loop is switched to. Therefore, when the motor is controlled by adopting the foregoing method, complex state switching is required, and a large number of parameters need to be adjusted. Consequently, the starting process of the motor is complex.

SUMMARY

A main technical problem to be resolved in implementations of the present application is to provide a simple and reliable starting method and apparatus for a permanent magnet synchronous motor, power system, and UAV.

To resolve the foregoing technical problem, embodiments of the present application provide the following technical solution:

A starting method for a permanent magnet synchronous motor, including:

obtaining a current motor rotational speed and motor position information of the permanent magnet synchronous motor;

determining whether the current motor rotational speed is less than a preset minimum rotational speed, and if the current motor rotational speed is less than the preset minimum rotational speed, using the preset minimum rotational speed as a feedback rotational speed; otherwise, using the current motor rotational speed as a feedback rotational speed; and performing closed-loop control on the permanent magnet synchronous motor according to the feedback rotational speed and the motor position information.

To resolve the foregoing technical problem, the embodiments of the present application further provide the following technical solution:

A starting apparatus for a permanent magnet synchronous motor, including:

a rotational speed and position information obtaining module, configured to obtain a current motor rotational speed and motor position information of the permanent magnet synchronous motor;

a feedback rotational speed determining module, configured to: determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed; and a closed-loop control module, configured to perform closed-loop control on the permanent magnet synchronous motor according to the feedback rotational speed and the motor position information.

To resolve the foregoing technical problem, the embodiments of the present application further provide the following technical solution:

A power system, including:

a permanent magnet synchronous motor; and the starting apparatus for a permanent magnet synchronous motor as described above, the starting apparatus for a permanent magnet synchronous motor being electrically connected to the permanent magnet synchronous motor and configured to control starting of the permanent magnet synchronous motor.

To resolve the foregoing technical problem, the embodiments of the present application further provide the following technical solution:

A UAV, including:

a body; and the power system as described above, mounted on the body and configured to provide flying power for the UAV.

To resolve the foregoing technical problem, the embodiments of the present application further provide the following technical solution:

A UAV, including:
a central housing;
an arm, where the arm is connected to the central housing;
a motor, where the motor is connected to the other end of the arm;
a motor controller, where the motor controller is located on the arm or inside a cavity formed by the central housing, an output end of the motor controller being connected to an input end of the motor; and
a propeller, connected to the motor, where the propeller, driven by the motor, generates a force that moves the UAV, where
the motor controller is configured to:
obtain a current motor rotational speed and motor position information of the motor;
determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed; and
perform closed-loop control on the motor according to the feedback rotational speed and the motor position information.

In the implementations of the present application, the preset minimum rotational speed is set in advance. When the calculated current motor rotational speed is less than the preset minimum rotational speed, the preset minimum rotational speed is used as the feedback rotational speed. When the calculated current motor rotational speed is greater than the preset minimum rotational speed, the current motor rotational speed is used as the feedback rotational speed. In this way, direct closed-loop control can be implemented. Locating and open-loop processes in the prior art are abandoned. Three steps of locating, open-loop control, and closed-loop control in a starting means of the prior art are directly simplified into using only closed-loop control. The motor starting method is simpler. Moreover, potential failure risks in multiple steps in the prior art are avoided, thereby effectively improving reliability of a starting process.

BRIEF DESCRIPTION OF THE DRAWINGS

To illustrate technical solutions of embodiments of the present application more clearly, the accompanying drawings that need to be used in the embodiments of the present application are briefly described below. Apparently, the accompanying drawings in the following description are merely some embodiments of the present application. Persons of ordinary skill in the art can derive other accompanying drawings from these accompanying drawings without creative efforts.

DETAILED DESCRIPTION

Figure 1:
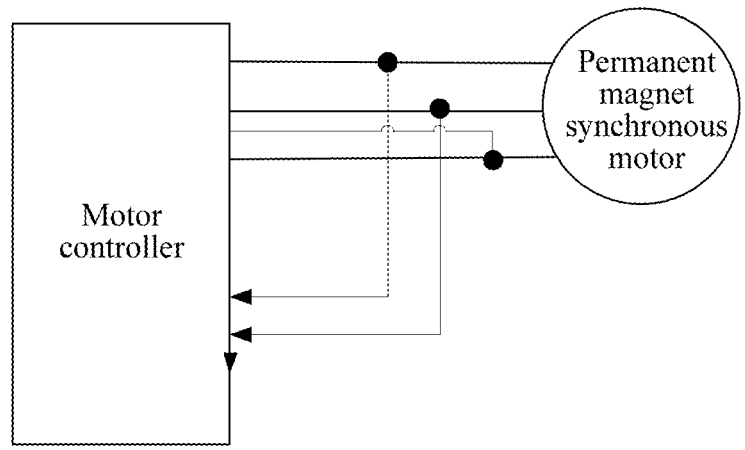
FIG. 1 is a structural principle diagram of an application scenario in which the starting method according to an embodiment of the present application is used.

Technical solutions in the present application are clearly and completely described in the following with reference to the accompanying drawings. Apparently, the embodiments to be described are merely some rather than all of the embodiments of the present application. All other embodiments obtained by persons of ordinary skill in the art based on the embodiments of the present application without creative efforts shall fall within the protection scope of the present application.

In the description of the present application, it should be noted that directions or position relationships indicated by terms, such as "center", "above", "below", "left", "right", "vertical", "horizontal", "inside", and "outside", are directions or position relationship indicated based on the accompanying drawings. The terms are merely used for ease of describing the present application and simplifying the description, but are not intended to indicate or imply that an indicated apparatus or element necessarily has a particular direction or is constructed and operated in a particular direction, and therefore, cannot be understood as limitations to the present application. In addition, terms, such as "first" and "second", are merely used for description, but cannot be understood as indicating or implying relative importance.

In the description of the present application, it should be noted that unless otherwise explicitly specified and defined, terms such as "install", "mutually connect", and "connection" should be understood broadly. For example, a connection may be a fixed connection, a detachable connection, or an integral connection; or may be a mechanical connection or an electrical connection; or may be a direct connection, an indirect connection implemented by using an intermediate medium, or an internal connection between two elements. Persons of ordinary skill in the art may understand specific meanings of the foregoing terms in the present application in specific cases.

In addition, technical features in different implementations of the present application described below can be combined with each other as long as they do not conflict with each other.

The embodiments of the present application may be applied to various movable objects driven by a motor, including, but not limited to, an Unmanned Aerial Vehicle (UAV, a steamship, and a robot. The UAV is used as an example for description. A structure of the UAV includes a central housing, an arm, and a power system. The arm and the central housing are integrally connected or fixedly connection. The power system is mounted on the arm. A typical power system includes a motor controller, a motor, and a propeller. The motor controller is located on the arm or inside a cavity formed by the central housing. One end of the motor controller is electrically connected to a throttle controller. The other end of the motor controller is electrically connected to the motor. The motor is mounted on the arm. A rotation shaft of the motor is connected to the propeller. The propeller, driven by the motor, generates a force that moves the UAV, for example, a lifting force or a propelling force that moves the UAV.

The motor controller receives a throttle signal from the throttle controller, generates a motor control signal used to control operation of the motor, and sends the generated motor control signal to the motor. The motor control signal, for example, includes a signal for controlling starting of the motor, a signal for controlling a rotational speed of the operation of the motor, and the like.

In an implementation, the throttle controller may be a flight control module of the UAV. The flight control module senses an environment around the UAV by using various sensors and controls flight of the UAV. The flight control module may be a processing unit, an application-specific integrated circuit (ASIC), or a field programmable gate array (FPGA).

When a user enters a power-on instruction by using a remote control, the flight control module of the UAV sends a throttle signal to the motor controller. The motor controller receives the throttle signal, generates a motor control signal used to start the motor, and sends the generated motor control signal to the motor.

As described in Related Art, for starting of a permanent magnet synchronous motor, in the prior art, the starting method therefor includes three steps: locating, open-loop control, and closed-loop control. For the permanent magnet synchronous motor, the present application provides a novel method and apparatus for controlling starting of a permanent magnet synchronous motor, power system, and UAV.

As shown in FIG. 1, FIG. 1 is a structural principle diagram of an application scenario of a starting method for a permanent magnet synchronous motor according to an embodiment of the present application. The starting method provided in this embodiment of the present application is applied to a permanent magnet synchronous motor. A motor controller controls starting of a motor by adopting the starting method for a permanent magnet synchronous motor in this embodiment of the present application. The motor controller receives a two-phase or three-phase current signal from the permanent magnet synchronous motor by using a current sensor (not shown in the figure). The motor controller outputs a three-phase voltage control signal to the permanent magnet synchronous motor, to control rotation of a rotor of the motor.

Figure 2:
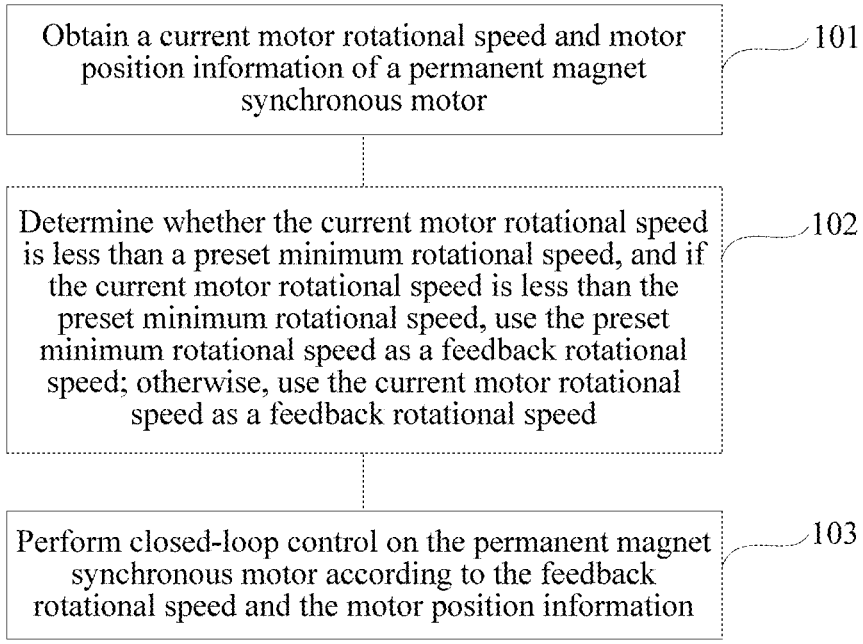
FIG. 2 is a flowchart of a starting method according to an embodiment of the present application.

As shown in FIG. 2, FIG. 2 is a flowchart of a starting method for a permanent magnet synchronous motor according to an embodiment of the present application. The starting method includes the following steps:

Step 101. Obtain a current motor rotational speed and motor position information of the permanent magnet synchronous motor.

Optionally, the current motor rotational speed may be measured by using a position sensor or without using a position sensor. That is, the current motor rotational speed is calculated by using a position sensorless method. The motor position information may be obtained through calculation according to the current motor rotational speed. Specifically, the motor position information refers to a rotor angle.

Step 102. Determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed.

It is determined whether the current motor rotational speed is less than the preset minimum rotational speed. If the current motor rotational speed is less than the preset minimum rotational speed, the preset minimum rotational speed is used as the feedback rotational speed. If the current motor rotational speed is greater than or equal to the preset minimum rotational speed, the current motor rotational speed is used as the feedback rotational speed. The preset minimum rotational speed is set in advance.

Step 103. Perform closed-loop control on the permanent magnet synchronous motor according to the feedback rotational speed and the motor position information.

In the closed-loop control, a rotational speed and an angle of the motor are usually calculated by using a position sensorless estimation algorithm. An advantage of this method is that an implementation process is simple, but there is also a problem that inaccurate estimation may occur when the motor rotational speed is relatively low. Therefore, in the prior art, an action is applied to the motor in an open-loop control manner. The closed-loop control is switched to only after the rotational speed and the angle of the motor can be relatively accurately estimated by using the position sensorless estimation algorithm when the rotational speed of the motor is higher than a proper value. In this embodiment of the present application, the motor is started directly by using a closed-loop control method, so that a step of open-loop control before the closed-loop control in the prior art is omitted. Therefore, an error problem that may be caused by stating the motor directly by using the closed-loop control method needs to be considered. Therefore, in this embodiment of the present application, the preset minimum rotational speed is set in advance. When the calculated current motor rotational speed is less than the preset minimum rotational speed, the preset minimum rotational speed is used as the feedback rotational speed. When the calculated current motor rotational speed is greater than the preset minimum rotational speed, the current motor rotational speed is used as the feedback rotational speed. A purpose of this is to limit an estimated value of the current motor rotational speed obtained by using a position sensorless algorithm, so as to prevent the estimated value of the rotational speed from being excessively low. When the estimated value of the rotational speed is greater than or equal to the preset minimum rotational speed, indicating that the estimated value of the rotational speed satisfies a requirement, the estimated current motor rotational speed may be directly used as the feedback rotational speed for the subsequent closed-loop control. When the estimated value of the rotational speed is less than the preset minimum rotational speed, indicating that the estimated value of the rotational speed is excessively low, the requirement is not satisfied. If the excessively low estimated value of the rotational speed is used, a relatively large error may be caused. In this case, the preset minimum rotational speed is used to replace the excessively low estimated value of the rotational speed and is used as the feedback rotational speed for the subsequent closed-loop control. In this way, direct closed-loop control can be implemented. Steps, such as complex status switching and adjustment on a relatively large number of parameters in the prior art are abandoned, a starting manner, including three steps, in the prior art is simplified, and the starting method is simpler. Moreover, potential failure risks in various states in the prior art are avoided, thereby effectively improving reliability of a starting process.

The control method in step 103 may be a vector control method or another control method.

The starting process of the permanent magnet synchronous motor is described below by using the vector control method as an example. It is assumed that the current motor rotational speed is ω1, and the preset minimum rotational speed is ω. If the current motor rotational speed ω1 is less than the preset minimum rotational speed ω, the preset minimum rotational speed ω is used as the feedback rotational speed ωs; otherwise, the current motor rotational speed ω1 is used as the feedback rotational speed ωs. The feedback speed ωs is subtracted from a given target rotational speed instruction ω* to obtain a speed deviation e. Pi-calculus is performed based on the speed deviation e to obtain a q-axis current instruction Iq*. Pi-calculus is performed based on the q-axis current instruction Iq* and a q-axis current instruction Iq that is fed back to obtain a q-axis voltage instruction Vq*. Pi-calculus is performed based on a given d-axis current instruction Id* and a d-axis current instruction Id that is fed back to obtain a d-axis voltage instruction Vd*. Park's transformation and Clarke's transformation are performed on Vd* and Vq* according to the d-axis voltage instruction Vd*, the q-axis voltage instruction Vq*, and the rotor angle θ to obtain a three-phase voltage instruction vu*, vv*, and vw*. PWM transformation is performed on the three-phase voltage instruction vu*, vv*, and vw*, to convert the three-phase voltage instruction vu*, vv*, and vw* into a three-phase PWM voltage vu, vv, and vw, and the three-phase PWM voltage vu, vv, and vw is output to the permanent magnet synchronous motor.

The q-axis current instruction Iq that is fed back and d-axis current instruction Id are obtained by using the following method. A two-phase current or a three-phase current of the permanent magnet synchronous motor is detected by using a current sensor. If the two-phase current is detected, the other phase current may be obtained through calculation according to the Kirchhoff's law, to obtain the three-phase current iu, iw, and iv. Clarke's transformation and Park's transformation are performed on the three-phase current iu, iv, and iw to obtain the d-axis current id and the q-axis current iq, and the d-axis current id and the q-axis current iq are fed back to the motor controller as feedback currents.

In some embodiments, in another embodiment of the method, the obtaining a current motor rotational speed and motor position information includes:

calculating the current motor rotational speed; and performing time integration on the current motor rotational speed, to obtain the motor position information.

Specifically, the motor position information refers to a rotor angle. Time integration is performed on the current motor rotational speed to obtain the rotor angle.

Figure 3:
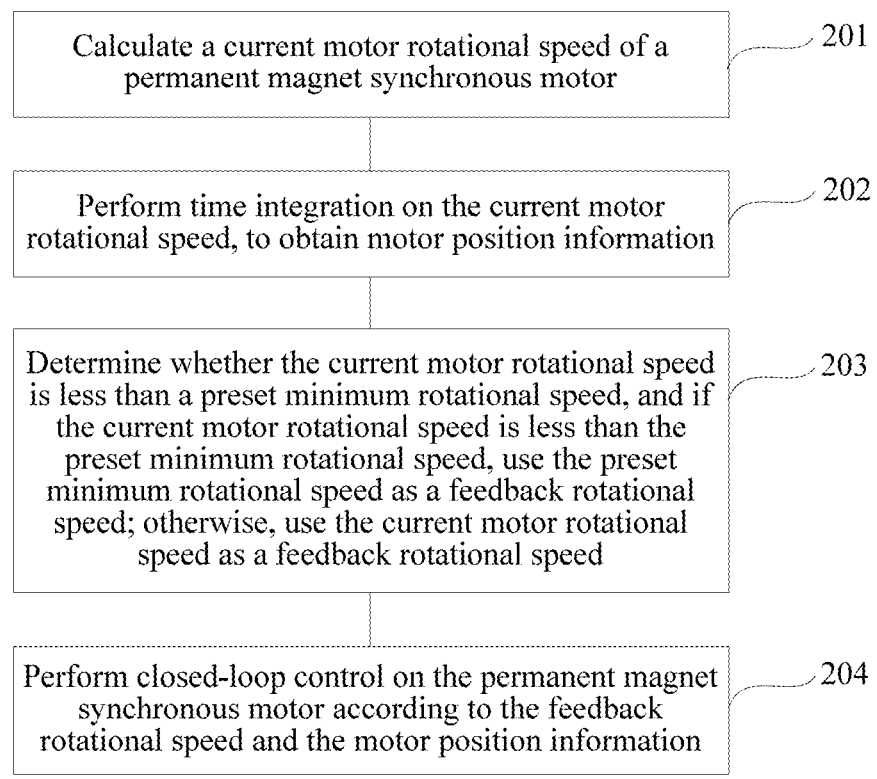
FIG. 3 is a flowchart of a starting method according to another embodiment of the present application.

As shown in FIG. 3, FIG. 3 is a flowchart of a starting method for a permanent magnet synchronous motor according to another embodiment of the present application. In this embodiment, the method includes the following steps:

Step 201. Calculate a current motor rotational speed of the permanent magnet synchronous motor.

Optionally, the current motor rotational speed may be measured by using a position sensor, or the current motor rotational speed may be calculated in a position sensorless manner.

Step 202. Perform time integration on the current motor rotational speed, to obtain motor position information.

Step 203. Determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed.

Step 204. Perform closed-loop control on the permanent magnet synchronous motor according to the feedback rotational speed and the motor position information.

It should be noted that although each step is marked with a number in the present application, an execution sequence of the steps are not limited according to the numbers. For example, in this embodiment, step 202 may be performed before step 203 or after step 203.

Optionally, in some embodiments of the method, the calculating a current motor rotational speed includes:

calculating the current motor rotational speed in a position sensorless manner.

If the position sensor manner is used, a position sensor does not need to be used, thereby saving costs and reducing an occupied volume.

How to calculate the current motor rotational speed in the position sensorless manner is described still by using a vector control method as an example. Clarke's transformation is performed on a q-axis voltage instruction Vq* and a d-axis voltage instruction Vd* that are obtained in previous control, to obtain an α-axis voltage instruction Vα* and a β-axis voltage instruction Vβ*. Clarke's transformation is performed on a three-phase current iu, iv, and iw obtained by using a current sensor, to obtain an α-axis current iα and a β-axis current iβ. The α-axis current iα, the β-axis current iβ, the α-axis voltage instruction Vα*, and the β-axis voltage instruction Vβ* are substituted into a speed phase observer algorithm based on a static coordinate system model and a static coordinate system model equation based on a synchronous motor, to calculate a current motor rotational speed ω1.

In addition, the motor rotational speed may be estimated in the position sensorless manner by using another common method, for example, a method based on a basic electromagnetic relationship of the permanent magnet synchronous motor, calculation of a three-phase end voltage and current, estimation based on a counter electromotive force or a stator flux, and an estimation method based on various observers. This is not limited in this embodiment.

Optionally, the starting method further includes:

adjusting a value of the preset minimum rotational speed when abnormal motor starting occurs.

If the abnormal motor starting occurs, for example, when an out-of-synchronization time of a motor exceeds a first preset time, or a motor cannot be started within a second preset time, adjustment may be performed by increasing (or reducing) the preset minimum rotational speed. The first preset time and the second preset time may be set in advance.

The value of the preset minimum rotational speed may be adjusted, to further ensure normal starting of the motor.

Figure 4:
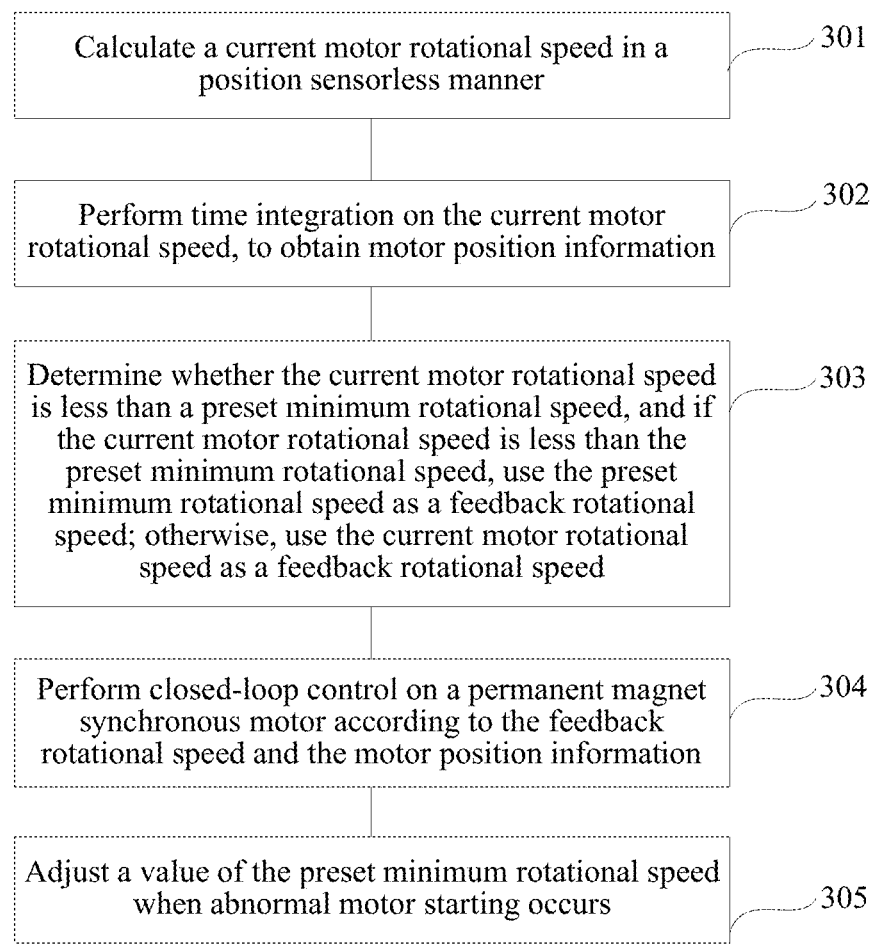
FIG. 4 is a flowchart of a starting method according to still another embodiment of the present application.

As shown in FIG. 4, FIG. 4 is a flowchart of a starting method for a permanent magnet synchronous motor according to another embodiment of the present application. In this embodiment, the method includes the following steps:

Step 301. Calculate a current motor rotational speed in a position sensorless manner.

Step 302. Perform time integration on the current motor rotational speed, to obtain motor position information.

Step 303. Determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed.

Step 304. Perform closed-loop control on the permanent magnet synchronous motor according to the feedback rotational speed and the motor position information.

Step 305. Adjust a value of the preset minimum rotational speed when abnormal motor starting occurs. In an implementation, the abnormal motor starting includes: an out-of-synchronization time of a motor exceeds a first preset time or a motor cannot be started within the second preset time.

The implementations of the present application are not limited to the sequence of the foregoing steps. Step 302 may be performed before step 303 or after step 303. Step 305 may be performed after step 304 or before step 304. The steps of the starting method in the implementations of the present application are performed in cycles until a stator and a rotor of the motor are synchronous and the motor is normally started.

In this embodiment of the present application, the preset minimum rotational speed is set in advance. When the calculated current motor rotational speed is less than the preset minimum rotational speed, the preset minimum rotational speed is used as the feedback rotational speed. When the calculated current motor rotational speed is greater than the preset minimum rotational speed, the current motor rotational speed is used as the feedback rotational speed. A purpose of this is to limit an estimated value of the current motor rotational speed obtained by using a position sensorless algorithm, so as to prevent the estimated value of the rotational speed from being excessively low. When the estimated value of the rotational speed is greater than or equal to the preset minimum rotational speed, indicating that the estimated value of the rotational speed satisfies a requirement, the estimated current motor rotational speed may be directly used as the feedback rotational speed for the subsequent closed-loop control. When the estimated value of the rotational speed is less than the preset minimum rotational speed, indicating that the estimated value of the rotational speed is excessively low, the requirement is not satisfied. If the excessively low estimated value of the rotational speed is used, a relatively large error may be caused. In this case, the preset minimum rotational speed is used to replace the excessively low estimated value of the rotational speed and is used as the feedback rotational speed for the subsequent closed-loop control. In this way, direct closed-loop control can be implemented. Steps, such as complex status switching and adjustment on a relatively large number of parameters, in the prior art are abandoned, a permanent magnet synchronous motor starting manner, including three steps, in a starting apparatus for a permanent magnet synchronous motor in the prior art is simplified, and the starting method is simpler. Moreover, potential failure risks in various states in the prior art are avoided, thereby effectively improving reliability of a starting process.

Figure 5:
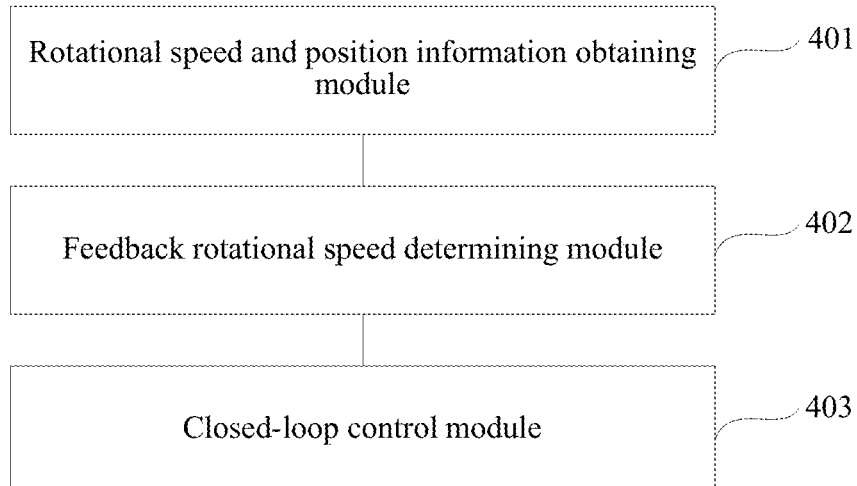
FIG. 5 is a schematic structural diagram of a starting apparatus according to an embodiment of the present application.

As shown in FIG. 5, FIG. 5 shows a starting apparatus for a permanent magnet synchronous motor according to an embodiment of the present application. The apparatus may be configured to perform the starting method for a permanent magnet synchronous motor disclosed in the embodiments of the present application. The starting apparatus includes:

a rotational speed and position information obtaining module 401, configured to obtain a current motor rotational speed and motor position information;

a feedback rotational speed determining module 402, configured to: determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed; and a closed-loop control module 403, configured to perform closed-loop control on the permanent magnet synchronous motor according to the feedback rotational speed and the motor position information.

Optionally, in another embodiment of the apparatus, the rotational speed and position information obtaining module includes:

a motor rotational speed calculation submodule, configured to calculate the current motor rotational speed; and a motor position information calculation submodule, configured to perform time integration on the current motor rotational speed, to obtain the motor position information.

In an embodiment, the rotational speed and position information obtaining module 401, the feedback rotational speed determining module 402, and the closed-loop control module 403 may be any one or more of an electrical adjustment module, a microcontroller unit, and a microprocessor unit.

In different implementations, the starting apparatus for a permanent magnet synchronous motor in this embodiment may be an electronic speed regulator, a motor controller, or the like.

Figure 6:
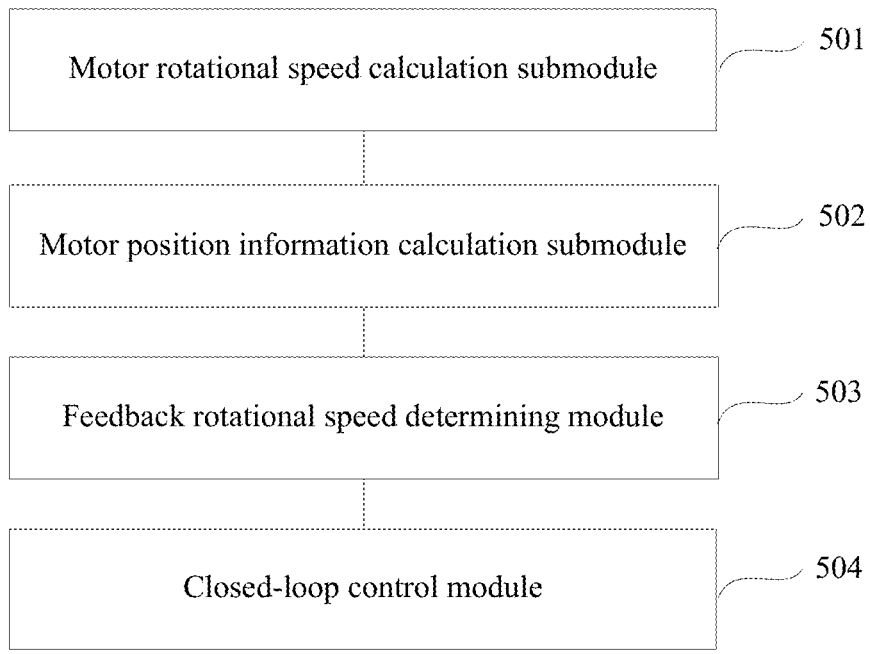
FIG. 6 is a schematic structural diagram of a starting apparatus according to another embodiment of the present application.

As shown in FIG. 6, FIG. 6 is a schematic structural diagram of a starting apparatus for a permanent magnet synchronous motor according to another embodiment of the present application. The apparatus may be configured to perform the starting method for a permanent magnet synchronous motor disclosed in the embodiments of the present application. In this embodiment, the starting apparatus includes:

a motor rotational speed calculation submodule 501, configured to calculate a current motor rotational speed;

a motor position information calculation submodule 502, configured to perform time integration on the current motor rotational speed, to obtain motor position information;

a feedback rotational speed determining module 503, configured to: determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed; and a closed-loop control module 504, configured to perform closed-loop control on the permanent magnet synchronous motor according to the feedback rotational speed and the motor position information.

The motor rotational speed calculation submodule 501 estimates the current motor rotational speed. The motor position information calculation submodule 502 performs time integration on the current motor rotational speed according to the current motor rotational speed estimated by the motor rotational speed calculation submodule 501, to obtain the motor position information. The feedback rotational speed determining module 503 compares the current motor rotational speed calculated by the motor rotational speed calculation submodule 501 with the preset minimum rotational speed and determines the feedback rotational speed. The closed-loop control module 504 performs closed-loop control according to the feedback rotational speed and the motor position information.

Optionally, in another embodiment of the apparatus, the motor rotational speed calculation submodule is configured to calculate the current motor rotational speed in a position sensorless manner.

Optionally, in another embodiment of the apparatus, the starting apparatus further includes:

a preset minimum rotational speed adjustment module, configured to adjust a value of the preset minimum rotational speed when abnormal motor starting occurs.

Optionally, in some embodiments of the apparatus, the abnormal motor starting includes:

an out-of-synchronization time of a motor exceeds a first preset time; or a motor cannot be started within a second preset time.

In an embodiment, the motor rotational speed calculation submodule 501, the motor position information calculation submodule 502, the feedback rotational speed determining module 503, and the closed-loop control module 504 may be any one or more of an electrical adjustment module, a microcontroller unit, and a microprocessor unit.

In different implementations, the starting apparatus for a permanent magnet synchronous motor in this embodiment may be an electronic speed regulator, a motor controller, or the like.

Figure 7:
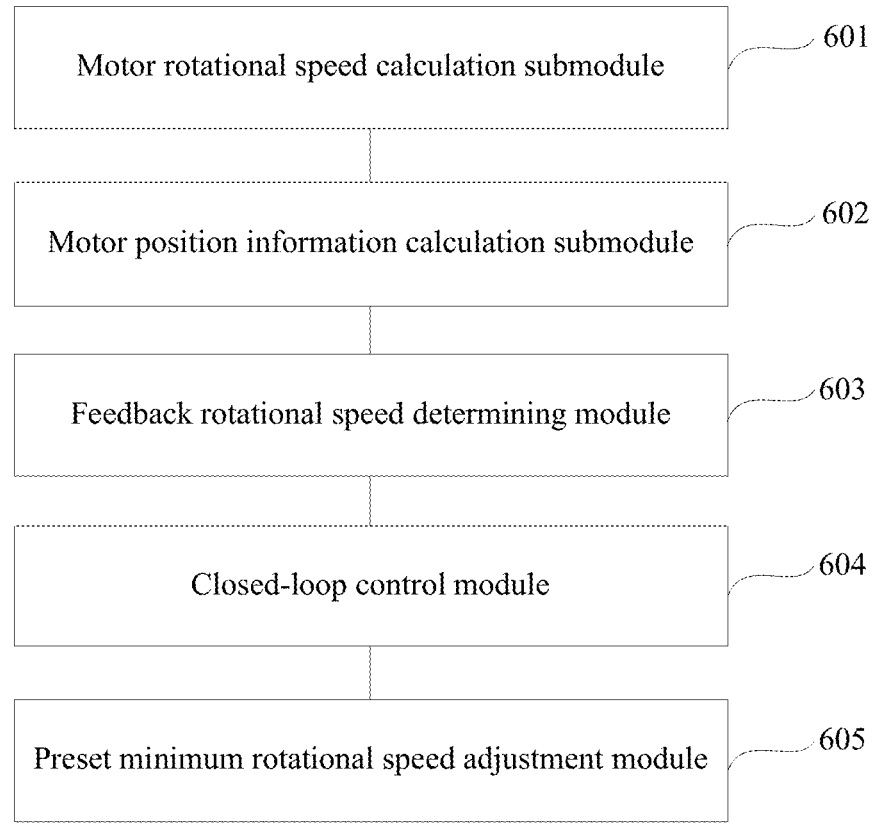
FIG. 7 is a schematic structural diagram of a starting apparatus according to another embodiment of the present application.

As shown in FIG. 7, FIG. 7 shows a starting apparatus for a permanent magnet synchronous motor according to another embodiment of the present application. The apparatus may be configured to perform the starting method for a permanent magnet synchronous motor disclosed in the embodiments of the present application. In this embodiment, the starting apparatus includes:

a motor rotational speed calculation submodule 601, configured to calculate a current motor rotational speed;

a motor position information calculation submodule 602, configured to perform time integration on the current motor rotational speed, to obtain motor position information;

a feedback rotational speed determining module 603, configured to: determine whether the current motor rotational speed is less than a preset minimum rotational speed, and if the current motor rotational speed is less than the preset minimum rotational speed, use the preset minimum rotational speed as a feedback rotational speed; otherwise, use the current motor rotational speed as a feedback rotational speed;

a closed-loop control module 604, configured to perform closed-loop control on the permanent magnet synchronous motor according to the feedback rotational speed and the motor position information; and a preset minimum rotational speed adjustment module 605, configured to adjust a value of the preset minimum rotational speed when abnormal motor starting occurs.

The preset minimum rotational speed adjustment module 605 is configured to: determine, in each control cycle, whether an out-of-synchronization time of a motor exceeds a first preset time or whether a motor cannot be started within a second preset time; and if such a case occurs, adjust the value of the preset minimum rotational speed.

In an embodiment, the motor rotational speed calculation submodule 601, the motor position information calculation submodule 602, the feedback rotational speed determining module 603, the closed-loop control module 604, and the preset minimum rotational speed adjustment module 605 may be any one or more of an electrical adjustment module, a microcontroller unit, and a microprocessor unit.

In different implementations, the starting apparatus for a permanent magnet synchronous motor in this embodiment may be an electronic speed regulator, a motor controller, or the like.

It should be noted that because the apparatus embodiments and the method embodiments in the embodiments of the present application are based on a same application concept, the technical content in the method embodiments is also applicable to the apparatus embodiments. Therefore, the technical content in the apparatus embodiments that is the same as that in the method embodiments is not described herein again.

The embodiments of the present application further provide a power system and a UAV. The power system includes a permanent magnet synchronous motor and the starting apparatus for a permanent magnet synchronous motor as described above. The starting apparatus for a permanent magnet synchronous motor is electrically connected to the permanent magnet synchronous motor and is configured to control starting of the permanent magnet synchronous motor. The UAV includes a body and the power system that is described above. The power system is mounted on the body and is configured to provide flying power for the UAV.

Figure 8:
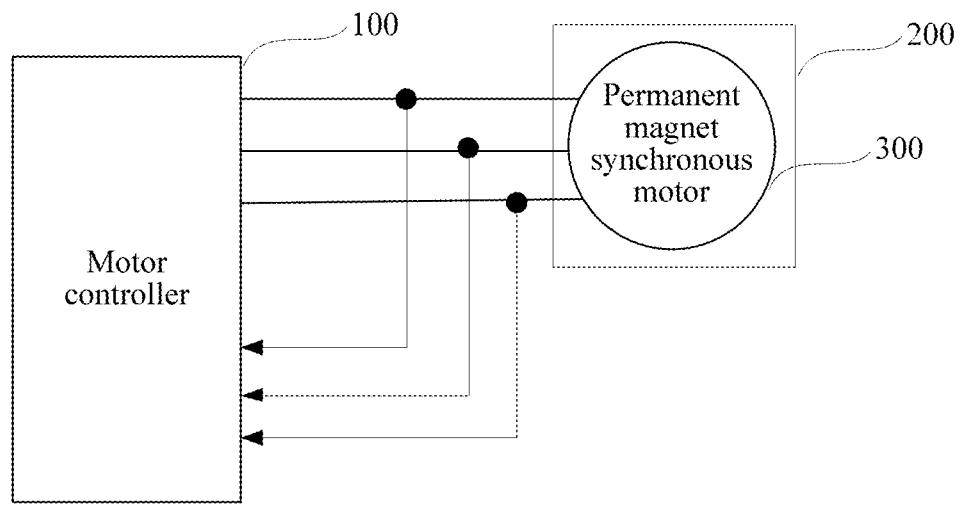
FIG. 8 is a schematic structural diagram of hardware of a UAV according to an embodiment of the present application.

As shown in FIG. 8, the embodiments of the present application further provide a UAV, to perform some or all steps of the starting method for a permanent magnet synchronous motor shown in FIG. 2 to FIG. 4. The UAV includes:

a body 200, a permanent magnet synchronous motor 300 mounted on the body 200, and a motor controller 100 configured to control the permanent magnet synchronous motor. The motor controller 100 of the permanent magnet synchronous motor 300 includes at least one microcontroller or microprocessor and a memory connected to the at least one microcontroller or microprocessor. The memory stores an instruction that may be executed by the at least one microcontroller or microprocessor. The instruction is executed by the at least one microcontroller or microprocessor, so that the at least one microcontroller or microprocessor can perform the starting method for a permanent magnet synchronous motor according to any of the foregoing exemplary embodiments.

In an exemplary embodiment, a storage medium is further provided. The storage medium is a computer-readable storage medium, for example, may include a temporary or non-temporary computer-readable storage medium of the instruction. The storage medium, for example, is a memory including an instruction. The foregoing instruction may be executed by a processor. A program stored in the storage medium performs the following steps when being executed by the processor:

obtaining a current motor rotational speed and motor position information of the motor;

determining whether the current motor rotational speed is less than a preset minimum rotational speed, and if the current motor rotational speed is less than the preset minimum rotational speed, using the preset minimum rotational speed as a feedback rotational speed; otherwise, using the current motor rotational speed as a feedback rotational speed; and performing closed-loop control on the motor according to the feedback rotational speed and the motor position information.

Optionally, the processor further performs the following step: adjusting a value of the preset minimum rotational speed when abnormal motor starting occurs.

Optionally, the abnormal motor starting includes:

an out-of-synchronization time of the motor exceeds a first preset time; or the motor cannot be started within a second preset time.

Optionally, the processor further performs the following steps: calculating the current motor rotational speed; and performing time integration on the current motor rotational speed, to obtain the motor position information.

Optionally, the processor further performs the following step: calculating the current motor rotational speed of the motor in a position sensorless manner.

Optionally, the motor is a permanent magnet synchronous motor.

Persons of ordinary skill in the art may understand that all or some of the procedures of the methods in the foregoing embodiments may be implemented by a computer program instructing relevant hardware. The program may be stored in a non-volatile computer readable storage medium. When the program is executed, procedures of the foregoing method embodiments may be performed. The storage medium may be a magnetic disk, an optical disc, a read-only memory (ROM), or the like.

Figure 9:
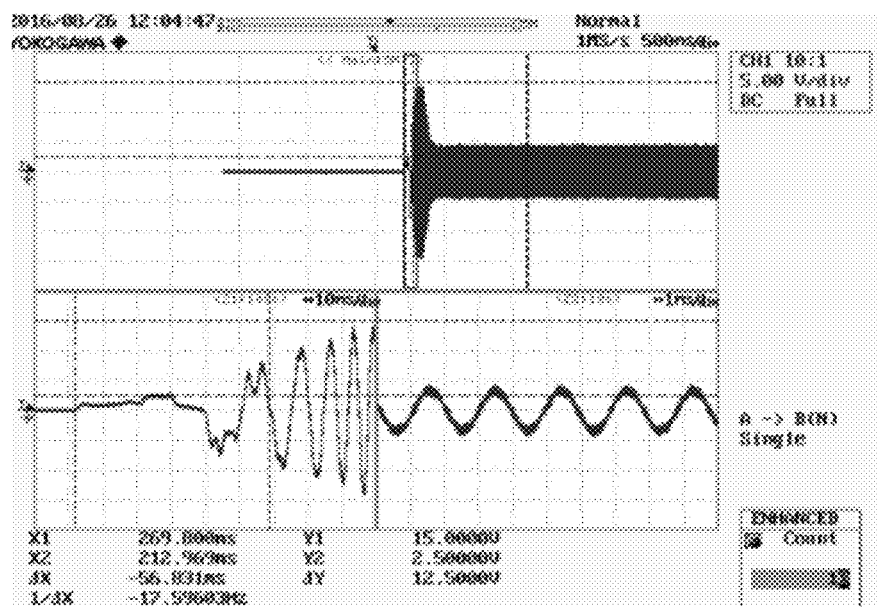
FIG. 9 is an experiment result diagram of starting a permanent magnet synchronous motor by using a starting method and a starting apparatus according to an embodiment of the present application.

It should be noted that the starting method and starting apparatus for a permanent magnet synchronous motor provided in the embodiments of the present application are applicable to an operation manner such as closed-loop operation or open-loop operation, are applicable to any control method (for example, a vector control method or other control methods), and are applicable to a surface-mounted or non-surface-mounted permanent magnet synchronous motor. FIG. 9 is an experiment result diagram of starting a permanent magnet synchronous motor by using a starting method and a starting apparatus according to an embodiment of the present application. As can be seen from the figure, a system needs only 56.83 ms to reach stability (a rotor is synchronous), so that the system can be effectively started within a short time.

In the starting method and starting apparatus for a permanent magnet synchronous motor in the embodiments of the present application, the current motor rotational speed is compared with the preset minimum rotational speed by using the feedback rotational speed determining module. When the calculated current motor rotational speed is less than the preset minimum rotational speed, the preset minimum rotational speed is used as the feedback rotational speed. When the calculated current motor rotational speed is greater than the preset minimum rotational speed, the current motor rotational speed is used as the feedback rotational speed. In this way, direct closed-loop control can be implemented, a starting manner, including three steps: locating, open-loop control, and closed-loop control, in the prior art is simplified, and starting of the UAV is implemented by using a simpler starting method. Moreover, potential failure risks in various states in the prior art are avoided, thereby effectively improving reliability of a starting process.

Finally, it should be noted that the foregoing embodiments are merely used to describe the technical solutions of the present application, but are not intended to limit the technical solutions of the present application. Based on the idea of the present application, the technical features in the foregoing embodiments or different embodiments may be combined, the steps may be performed in any sequence, and there are many other changes in different aspects of the present application as described above. For brevity, the changes are not provided in detail. Although the present application is described in detail with reference to the foregoing embodiments, Persons of ordinary skill in the art should understand that they may amend the technical solutions recorded in the foregoing embodiments or make equivalent replacements on some technical features. The modifications or replacements do not make the corresponding technical solutions essentially depart from the scope of the technical solutions of the embodiments of the present application.

What is claimed is:

1. An unmanned aerial vehicle, comprising:
a central housing;
an arm connected to the central housing;
a motor mounted on the arm;
a propeller connected to the motor, wherein the propeller is configured to generate a force that moves the unmanned aerial vehicle;
a motor controller comprising a memory and at least one microcontroller or microprocessor, wherein the motor controller is located on the arm or inside a cavity formed by the central housing; and
a flight control system configured to control flight of the unmanned aerial vehicle, wherein the flight control system is one of a processing unit, an application-specific integrated circuit, and a field programmable gate array;
wherein the flight control system is further configured to send a throttle signal to the motor controller for starting the motor;
wherein the motor controller is configured to:
obtain a current motor rotational speed and motor position information of the motor;
determine whether the current motor rotational speed is less than a preset minimum rotational speed;
set a feedback rotational speed as the preset minimum rotational speed based on a determination that the current motor rotational speed is less than the preset minimum rotational speed; and
perform closed-loop control on the motor according to the feedback rotational speed and the motor position information.

2. The unmanned aerial vehicle according to claim 1, wherein the motor controller is further configured to:
adjust a value of the preset minimum rotational speed.

3. The unmanned aerial vehicle according to claim 2, wherein the motor controller is configured to increase or reduce the value of the preset minimum rotational speed.

4. The unmanned aerial vehicle according to claim 1, wherein the motor controller is configured to adjust a value of the preset minimum rotational speed based on a determination that abnormal starting of the motor occurs.

5. The unmanned aerial vehicle according to claim 1, wherein the motor controller is configured to adjust a value of the preset minimum rotational speed based on a determination that an out-of-synchronization time of the motor exceeds a first preset time, or that the motor cannot be started within a second preset time.

6. The unmanned aerial vehicle according to claim 1, wherein the motor controller is specifically configured to:
calculate the current motor rotational speed of the motor; and
perform time integration on the current motor rotational speed, to obtain the motor position information.

7. The unmanned aerial vehicle according to claim 6, wherein the motor controller is configured to calculate the current motor rotational speed of the motor in a position sensorless manner.

8. The unmanned aerial vehicle according to claim 1, wherein the motor is a permanent magnet synchronous motor.

9. A starting method for a motor, comprising:
obtaining, by a motor controller, a current motor rotational speed and motor position information of the motor;
determining, by the motor controller, whether the current motor rotational speed is less than a preset minimum rotational speed;
set, by the motor controller, a feedback rotational speed as the preset minimum rotational speed based on a determination that the current motor rotational speed is less than the preset minimum rotational speed; and
performing, by the motor controller, closed-loop control on the motor according to the feedback rotational speed and the motor position information.

10. The starting method according to claim 9, further comprising:
adjusting a value of the preset minimum rotational speed.

11. The starting method according to claim 10, wherein the adjusting the value of the preset minimum rotational speed comprises:
increasing or reducing the value of the preset minimum rotational speed.

12. The starting method according to claim 10, wherein the adjusting the value of the preset minimum rotational speed comprises:
adjusting the value of the preset minimum rotational speed based on a determination that abnormal motor starting occurs.

13. The starting method according to claim 12, wherein the adjusting the value of the preset minimum rotational speed comprises:
adjusting the value of the preset minimum rotational speed based on a determination that an out-of-synchronization time of the motor exceeds a first preset time, or that the motor cannot be started within a second preset time.

14. The starting method according to claim 9, wherein the obtaining a current motor rotational speed and motor position information of the motor comprises:
calculating the current motor rotational speed of the motor; and
performing time integration on the current motor rotational speed, to obtain the motor position information.

15. The starting method according to claim 14, wherein the calculating the current motor rotational speed comprises:
calculating the current motor rotational speed of the motor in a position sensorless manner.

16. The starting method according to claim 9, wherein the motor is a permanent magnet synchronous motor.

* * * * *